United States Patent
Price et al.

(10) Patent No.: US 10,872,353 B2
(45) Date of Patent: Dec. 22, 2020

(54) PROVIDING CONTENT TO STORE VISITORS WITHOUT REQUIRING PROACTIVE INFORMATION SHARING

(71) Applicant: Google Inc., Mountain View, CA (US)

(72) Inventors: Thomas Price, San Francisco, CA (US); Tuna Toksoz, Mountain View, CA (US)

(73) Assignee: Google LLC, Mountain View, CA (US)

( * ) Notice: Subject to any disclaimer, the term of this patent is extended or adjusted under 35 U.S.C. 154(b) by 729 days.

(21) Appl. No.: 14/968,378

(22) Filed: Dec. 14, 2015

(65) Prior Publication Data

US 2017/0169472 A1 Jun. 15, 2017

(51) Int. Cl.
*G06Q 30/02* (2012.01)
*H04W 4/33* (2018.01)
*H04W 4/021* (2018.01)

(52) U.S. Cl.
CPC ..... *G06Q 30/0261* (2013.01); *G06Q 30/0255* (2013.01); *G06Q 30/0259* (2013.01);
(Continued)

(58) Field of Classification Search
CPC ...... G06Q 30/0261; G06Q 30/02; H04W 4/33
See application file for complete search history.

(56) References Cited

U.S. PATENT DOCUMENTS 8,140,746 B2   3/2012  Trichina et al.
8,495,065 B2   7/2013  Petersen et al.
(Continued)

FOREIGN PATENT DOCUMENTS

JP   2000-259977 A   9/2000
JP   2008-276473 A   11/2008
(Continued)

OTHER PUBLICATIONS

Byoungjip Kim, et al. 2011. AdNext: a visit-pattern-aware mobile advertising system for urban commercial complexes. In Proceedings of the 12th Workshop on Mobile Computing Systems and Applications (HotMobile'11). Available at: DOI:https://doi.org/10.1145/2 (Year: 2011).*

(Continued)

*Primary Examiner* — Katherine Kolosowski-Gager
(74) *Attorney, Agent, or Firm* — Foley & Lardner LLP

(57) ABSTRACT

A method includes receiving, at a user device including one or more processors, a signal pushed to the user device from an in-store device physically located in a store. The signal includes a first store identifier. The method further includes storing the first store identifier in memory. The method further includes receiving a content item from a third-party content provider device, the content item including a second store identifier. The third-party content provider device transmits the content item to a plurality of user devices within a geographic area around a location associated with the second store identifier. The method further includes providing the content item for display in response to determining the first store identifier matches the second store identifier. The content item is displayed without providing an indication of the presence of the user device at the store to the in-store device or to the third-party content provider device.

20 Claims, 4 Drawing Sheets

(52) U.S. Cl.
CPC ..... *G06Q 30/0267* (2013.01); *G06Q 30/0269* (2013.01); *H04W 4/021* (2013.01); *H04W 4/33* (2018.02)

(56) References Cited

U.S. PATENT DOCUMENTS

| | | | |
|---|---|---|---|
| 8,639,221 | B1 | 1/2014 | Zang et al. |
| 2002/0010629 | A1 | 1/2002 | Diamond |
| 2005/0038669 | A1 | 2/2005 | Sachdeva et al. |
| 2005/0038699 | A1 | 2/2005 | Lillibridge et al. |
| 2007/0264974 | A1 | 11/2007 | Frank et al. |
| 2009/0224970 | A1 | 9/2009 | Tsau |
| 2010/0131475 | A1 | 5/2010 | Kataoka et al. |
| 2011/0047032 | A1 | 2/2011 | Kumar et al. |
| 2012/0095805 | A1 | 4/2012 | Ghosh et al. |
| 2012/0276927 | A1 | 11/2012 | Pitt |
| 2013/0185429 | A1 | 7/2013 | Yuan et al. |
| 2013/0304536 | A1 | 11/2013 | Hamachi |
| 2014/0025660 | A1 | 1/2014 | Mohammed et al. |
| 2014/0136212 | A1 | 5/2014 | Kwon et al. |
| 2014/0136312 | A1 | 5/2014 | Saksena et al. |
| 2014/0156346 | A1 | 6/2014 | Cai |
| 2014/0164111 | A1 | 6/2014 | Rodriguez et al. |
| 2014/0249883 | A1 | 9/2014 | Cicchitto et al. |
| 2014/0282620 | A1* | 9/2014 | Nuovo ............ G06F 17/30867 719/318 |
| 2014/0297363 | A1 | 10/2014 | Vemana |
| 2014/0304068 | A1* | 10/2014 | Weinblatt .......... G06Q 30/0248 705/14.47 |
| 2014/0365273 | A1 | 12/2014 | Hurewitz |
| 2015/0009915 | A1 | 1/2015 | Baek et al. |
| 2015/0038171 | A1 | 2/2015 | Uilecan et al. |
| 2015/0088612 | A1 | 3/2015 | Palan et al. |
| 2015/0130983 | A1 | 5/2015 | Yamaguchi |
| 2015/0269624 | A1* | 9/2015 | Cheng ............... G06Q 30/0267 705/14.58 |
| 2015/0304331 | A1 | 10/2015 | Nakagawa et al. |
| 2016/0063278 | A1 | 3/2016 | Kraska et al. |
| 2016/0125467 | A1* | 5/2016 | Scott ................. G06Q 30/0261 705/14.58 |
| 2016/0321702 | A1* | 11/2016 | Lerman ............. G06Q 30/0267 |
| 2017/0092278 | A1 | 3/2017 | Evermann et al. |
| 2017/0110130 | A1 | 4/2017 | Sharifi et al. |
| 2017/0110144 | A1 | 4/2017 | Sharifi et al. |
| 2017/0132019 | A1 | 5/2017 | Karashchuk et al. |
| 2017/0358301 | A1 | 12/2017 | Raitio et al. |

FOREIGN PATENT DOCUMENTS

| | | |
|---|---|---|
| JP | 2009-187165 A | 8/2009 |
| JP | 2014-032550 | 2/2014 |
| JP | 2014-109647 A | 6/2014 |
| JP | 2014-153828 A | 8/2014 |
| JP | 2015-033084 | 2/2015 |
| JP | 2015-057870 A | 3/2015 |
| JP | 2015-184072 | 10/2015 |
| WO | WO-2006/048511 A1 | 5/2006 |
| WO | WO-2008/142800 A1 | 11/2008 |
| WO | WO-2011/142327 A1 | 11/2011 |
| WO | WO-2015/009915 A2 | 1/2015 |
| WO | WO-2015/130983 A1 | 9/2015 |

OTHER PUBLICATIONS

"Walmart and Google to offer voice-enabled shopping", BBC News, Aug. 23, 2017 (10 pages).
Amazon, "Echo Look | Hands-Free Camera and Style Assistant", reprinted from https://www.amazon.com/gp/product/B0186JAEWK?ref%5F=cm%5Fsw%5Fr%5Ffa%5Fdp%5Ft2%5FC5oazbJTKCB18&pldnSite=1 on Aug. 22, 2017 (7 pages).
Broussard, Mitchel, "Chatbot-Like Siri Patent Includes Intelligent Image, Video, and Audio Recognition within Messages", MacRumors, May 11, 2017 (7 pages).
Chen, Lulu Yilun, "Alibaba Challenges Google, Amazon With New Echo-Like Device", Bloomberg Technology, Jul. 5, 2017 (3 pages).
Clover, Juli, "Amazon and Google Want to Turn Their Smart Home Speakers Into Telephone Replacements", MacRumors, Feb. 15, 2017 (5 pages).
Collins, et al., "Can Twitter Save Itself?", cnet, Apr. 26, 2017, reprinted from https://www.cnet.com/news/twitter-q1-2017-earnings/ on Aug. 22, 2017 (2 pages).
Crist, Ry, "Logitech Harmony's Alexa Skill just got a whole lot better", cnet, Jul. 13, 2017 (2 pages).
Patently Apple, "Today Google Home's Virtual Assistant can learn its Owner's voice for Security Reasons like Apple's Patent Pending Idea", Apr. 20, 2017, reprinted from http://www.patentlyapple.com/patently-apple/2017/04/today-google-homes-virtual-assistant-can-learn-its-owners-voice-for-security-reasons-like-apples-patent-pending-idea.html on Aug. 22, 2017 (4 pages).
Patently Mobile, "The Patent behind Google Home's new Feature of Understanding Different Voices in the Home Surfaced Today", Apr. 20, 2017, reprinted from http://www.patentlymobile.com/2017/04/the-patent-behind-google-homes-new-feature-of-understanding-different-voices-in-the-home-surfaced-today.html, on Aug. 22, 2017 (3 pages).
Perez, Sarah, "The first ad network for Alexa Skills shuts down following Amazon's policy changes", Tech Crunch, Jun. 15, 2017 (6 pages).
Porter, Jon, "Amazon Echo Show release date, price, news and features", Techradar, Jun. 26, 2017 (14 pages).
Sablich, Justin, "Planning a Trip With the Help of Google Home", New York Times, May 31, 2017 (6 pages).
Seifert, Dan, "Samsung's new virtual assistant will make using your phone easier", The Verge, Mar. 20, 2017 (6 pages).
Sherr, Ian, "IBM built a voice assistant for cybersecurity", cnet, Feb. 13, 2017 (2 pages).
Siegal, Daniel, "IP Attys Load Up Apps' Legal Challenges At 'Silicon Beach'", Law360, Los Angeles, California, Feb. 2, 2017 (4 pages).
Smith, Dave, "The Amazon Echo got 2 incredibly useful features thanks to a new update", Business Insider, Jun. 1, 2017 (5 pages).
Willens, Max, "For publishers, Amazon Alexa holds promise but not much money (yet)", Digiday, Jul. 6, 2017 (6 pages).
International Search Report and Written Opinion for Application No. PCT/US2016/066289, dated Feb. 28, 2017.
Abrams, Help users find, interact & re-engage with your app on the Google Assistant, Google Developers Blog, Nov. 15, 2017, 16 pages.
Albrecht, "Alexa, How Can You Be Used in Restaurants?", the spoon, Dec. 10, 2017, 6 pages.
Barr, "AWS DeepLens—Get Hands-On Experience with Deep Learning With Our New Video Camera", AWS News Blog, Nov. 29, 2017, 11 pages.
Buckland et al., "Amazon's Alexa Takes Open-Source Route to Beat Google Into Cars", Bloomberg, Feb. 27, 2018, 6 pages.
Coberly, "Apple patent filing reveals potential whispering Siri functionality", Techspot, Dec. 14, 2017, 4 pages.
Estes, "Amazon's Newest Gadget Is a Tablet That's Also an Echo", Gizmodo, Sep. 19, 2017, 3 pages.
Foghorn Labs, 10 Tips to Improve the Performance of Google Product Listing Ads, printed from Internet address: http://www.foghornlabs.com/2012/11/21/product-listing-ads-best-practices/, on Mar. 18, 2013, 5 pages.
Google Inc., Products Feed Specification, printed from Internet address: http://www.support.google.com/merchants/bin/answer.py?hl=en&answer=188494#US, on Mar. 18, 2013, 6 pages.
Google Inc., Supported File Formats, printed from Internet address: http://www.support.google.com/merchants/bin/answer.py?hl=en&answer=160567, on Mar. 18, 2013, 1 page.
Heater, "Amazon Alexa devices can finally tell voices apart", TechCrunch, Oct. 11, 2017, 6 pages.
International Preliminary Report and Written Opinion re PCT/US2016/066320 dated Jun. 19, 2018.
International Preliminary Report on Patentability re PCT/US2016/066289 dated Jun. 19, 2018.

(56) References Cited

OTHER PUBLICATIONS

Johnston, "Amazon Whirlwind: New Echo, Plus, Spot, Connect, Fire TV Take the Stage", Twice, Sep. 27, 2017, 4 pages.
Kelion, "Amazon revamps Echo smart speaker family", BBC News, Sep. 27, 2017, 11 pages.
Krishna, "Jim Beam's smart decanter will pour you a shot when you ask", engadget, Nov. 29, 2017, 3 pages.
Lacy, "Improving search and advertising are the next frontiers for voice-activated devices", TechCrunch, Dec. 20, 2017, 13 pages.
Lee, Take Two for Samsung's troubled Bixby assistant', BBC News, Oct. 19, 2017, 6 pages.
Lund, Pamela, Mastering Google Product Feeds and Product Listing Ads $2013 Part 1, found at http://www.blueglass.com/blog/mastering-google-product-feeds-and-product-listing-ads-part-1/#comments, Dec. 28, 2013, 17 pages.
Non-Final Office Action on U.S. Appl. No. 14/968,356 dated Jun. 25, 2018.
Novet, et al., "Amazon is getting ready to bring Alexa to work", CNBC, Nov. 29, 2017, 4 pages.
Palladino, "Garmin teamed up with Amazon to make a tiny Echo Dot for your car", ars Technica, Oct. 17, 2017, 2 pages.
Perez, "Alexa's 'Routines' will combine smart home control with other actions, like delivering your news and weather", TechCrunch, Sep. 28, 2017, 10 pages.
Pringle, "'I'm sorry to hear that': Why training Siri to be a therapist won't be easy", CBC News, Sep. 24, 2017, 3 pages.
Unknown Author, "'Dolphin' attacks fool Amazon, Google voice assistants", BBC News, Sep. 7, 2017, 8 pages.
Final Office Action on U.S. Appl. No. 14/968,356 dated Jan. 8, 2019.
Final Office Action on U.S. Appl. No. 15/689,938 dated May 2, 2019.
Foreign Action other than Search Report on 098981-5475 dated Jan. 28, 2019 (Decision of Rejection).
Japanese Office Action dated Oct. 15, 2018 for application No. 2017-567731.
Non-Final Office Action on U.S. Appl. No. 15/689,938 dated Oct. 30, 2018.
Notice of Allowance on U.S. Appl. No. 14/968,356 dated May 8, 2019.
Notice of Reasons for Rejections for JP Application No. 2017-567731 dated Oct. 15, 2018.
Notice of Allowance for U.S. Appl. No. 14/968,356 dated Nov. 18, 2019 (9 pages).
Notice of Allowance on U.S. Appl. No. 15/689,938 dated Jul. 31, 2019 (10 pages).
Notice of Allowance on U.S. Appl. No. 15/689,938 dated Oct. 11, 2019 (10 pages).
U.S. Notice of Allowance for U.S. Appl. No. 14/968,356 dated Sep. 26, 2019 (9 pages).
Notice of Allowance for U.S. Appl. No. 15/689,938 dated Dec. 4, 2019 (10 pages).
Notice of Reasons for Rejection for JP Appln. Ser. No. 2019-99298 dated Jun. 22, 2020 (17 pages).
Forrest, Conner, "Essential Home wants to be bridge between Amazon's Alexa, Apple's Siri, and Google Assistant", TechRepublic, May 31, 2017 (10 pages).
Foxx, Chris, "Apple reveals HomePod smart speaker", BBC News, Jun. 5, 2017 (6 pages).
Gebhart, Andrew, "Google Assistant is spreading, but it needs its own Echo Dot", cnet, May 20, 2017 (7 pages).
Gebhart, Andrew, "Google Home to the Amazon Echo: 'Anything you can do . . . '", cnet, May 18, 2017 (7 pages).
Gibbs, Samuel, "Your Facebook Messenger app is about to be filled with ads", The Guardian, Jul. 12, 2017 (3 pages).
Golgowski, Nina, "This Burger King Ad Is Trying to Control Your Google Home Device", Huffpost, Apr. 12, 2017 (7 pages).
Google Developers, "GoogleAssistant SDK" reprinted from https://developers.google.com/assistant/sdk/ on Aug. 22, 2017 (4 pages).
Gurma, et al., "Apple Is Manufacturing a Siri Speaker to Outdo Google and Amazon", Bloomberg, May 31, 2017 (5 pages).
Hardwick, Tim, "Facebook Smart Speaker Coming Next Year With 15-inch Touch Panel", MacRumors, Jul. 25, 2017 (5 pages).
International Search Report on International Application No. PCT/US2016/066320, 10 pages.
Kelion, Leo, "Amazon's race to make Alexa smarter", BBC News, Jul. 28, 2017 (8 pages).
Koetsier, John, "Ads on Amazon Echo: Wendy's, ESPN, and Progressive Among Brands Testing", Forbes, May 11, 2017 (2 pages).
Larson, Selena, "Google Home now recognizes your individual voice", CNN Money, San Francisco, California, Apr. 20, 2017 (3 pages).
Lee, Dave, "The five big announcements from Google I/O", BBC News, May 18, 2017 (9 pages).
Nieva, Richard, "Google Home and eBay can tell you how much that's worth", cnet, Mar. 8, 2017 (3 pages).
Patently Apple, "Apple Patent Reveals a New Security Feature Coming to Siri", Apr. 4, 2017, reprinted from http://www.patentlyapple.com/patently-apple/2017/04/apple-patent-reveals-a-new-security-feature-coming-to-siri.html, on Aug. 22, 2017 (6 pages).
Examination Report for EP Appln. U.S. Appl. No. 16867395.2 dated Oct. 14, 2020 (6 pages).

\* cited by examiner

PROVIDING CONTENT TO STORE VISITORS WITHOUT REQUIRING PROACTIVE INFORMATION SHARING

CROSS-REFERENCE TO RELATED APPLICATIONS

The subject matter of the present disclosure is related to the subject matter of U.S. patent application Ser. No. 14/968,378, titled "STORE VISIT DATA CREATION AND MANAGEMENT," which was filed on the same day as the present application and is incorporated herein by reference in its entirety.

BACKGROUND

Store owners (and other content providers) may wish to provide targeted content to visitors of their store. In some circumstances, stores accomplish provision of targeted content by manually collecting information from the visitors (e.g., email address or physical address), which causes privacy concerns. Further, such methods may require storing customer data, configuring store devices (e.g., beacons, WiFi routers) to transmit back and forth with user devices.

SUMMARY

One illustrative implementation of the disclosure relates to a method. The method includes receiving, at a user device comprising one or more processors, a signal pushed to the user device from an in-store device physically located in a store. The signal includes a first store identifier. The method further includes storing, by the one or more processors, the first store identifier in memory. The method further includes receiving, at the user device, a content item from a third-party content provider device. The content item includes a second store identifier. The third-party content provider device is configured to transmit the content item to a plurality of user devices within a geographic area around a location associated with the second store identifier. The method further includes providing, by the one or more processors, the content item for display in response to determining the user device was present at the store without providing an indication of the presence of the user device at the store to the in-store device or to the third-party content provider device. This is accomplished at the user device by comparing the first store identifier to the second store identifier and, in response to determining the first store identifier matches the second store identifier, providing the content item for display on the user device.

Another implementation relates to a system including at least one computing device operably coupled to at least one memory. The at least one computing device is configured to receive a signal pushed to the user device from an in-store device physically located in a store. The signal includes a first store identifier. The at least one computing device is further configured to store the first store identifier in memory. The at least one computing device is further configured to receive a content item from a third-party content provider device. The content item includes a second store identifier. The third-party content provider device is configured to transmit the content item to a plurality of user devices within a geographic area around a location associated with the second store identifier. The at least one computing device is further configured to provide the content item for display in response to determining the user device was present at the store without providing an indication of the presence of the user device at the store to the in-store device or to the third-party content provider device. This is accomplished at the user device by comparing the first store identifier to the second store identifier and, in response to determining the first store identifier matches the second store identifier, providing the content item for display on the user device.

Yet another implementation relates to one or more computer-readable storage media having instructions stored thereon that, when executed by one or more processors, cause the one or more processors to execute operations. The operations include receiving, at a user device comprising one or more processors, a signal pushed to the user device from an in-store device physically located in a store. The signal includes a first store identifier. The operations further include storing, by the one or more processors, the first store identifier in memory. The operations further include receiving, at the user device, a content item from a third-party content provider device. The content item including a second store identifier. The third-party content provider device is configured to transmit the content item to a plurality of user devices within a geographic area around a location associated with the second store identifier. The operations further include providing, by the one or more processors, the content item for display in response to determining the user device was present at the store without providing an indication of the presence of the user device at the store to the in-store device or to the third-party content provider device. This is accomplished by comparing the first store identifier to the second store identifier and, in response to determining the first store identifier matches the second store identifier, providing the content item for display on the user device.

Yet another implementation relates to a method. The method includes receiving, at a user device comprising one or more processors, a signal pushed to the user device from an in-store device physically located in a store. The signal includes a first store identifier. The method further includes storing, by the one or more processors, the first store identifier in memory. The method further includes transmitting, by the one or more processors, the first store identifier to a third-party content provider device. The method further includes, in response to the first store identifier matching a second store identifier associated with a content item, receiving, by the one or more processors, the content item from the third-party content provider device. The method further includes providing, by the one or more processors, the content item for display on the user device without providing an indication of the presence of the user device at the store to the in-store device.

BRIEF DESCRIPTION OF THE DRAWINGS

The details of one or more implementations of the subject matter described in this specification are set forth in the accompanying drawings and the description below. Other features, aspects, and advantages of the subject matter will become apparent from the description, the drawings, and the claims.

DETAILED DESCRIPTION

Figure 1:
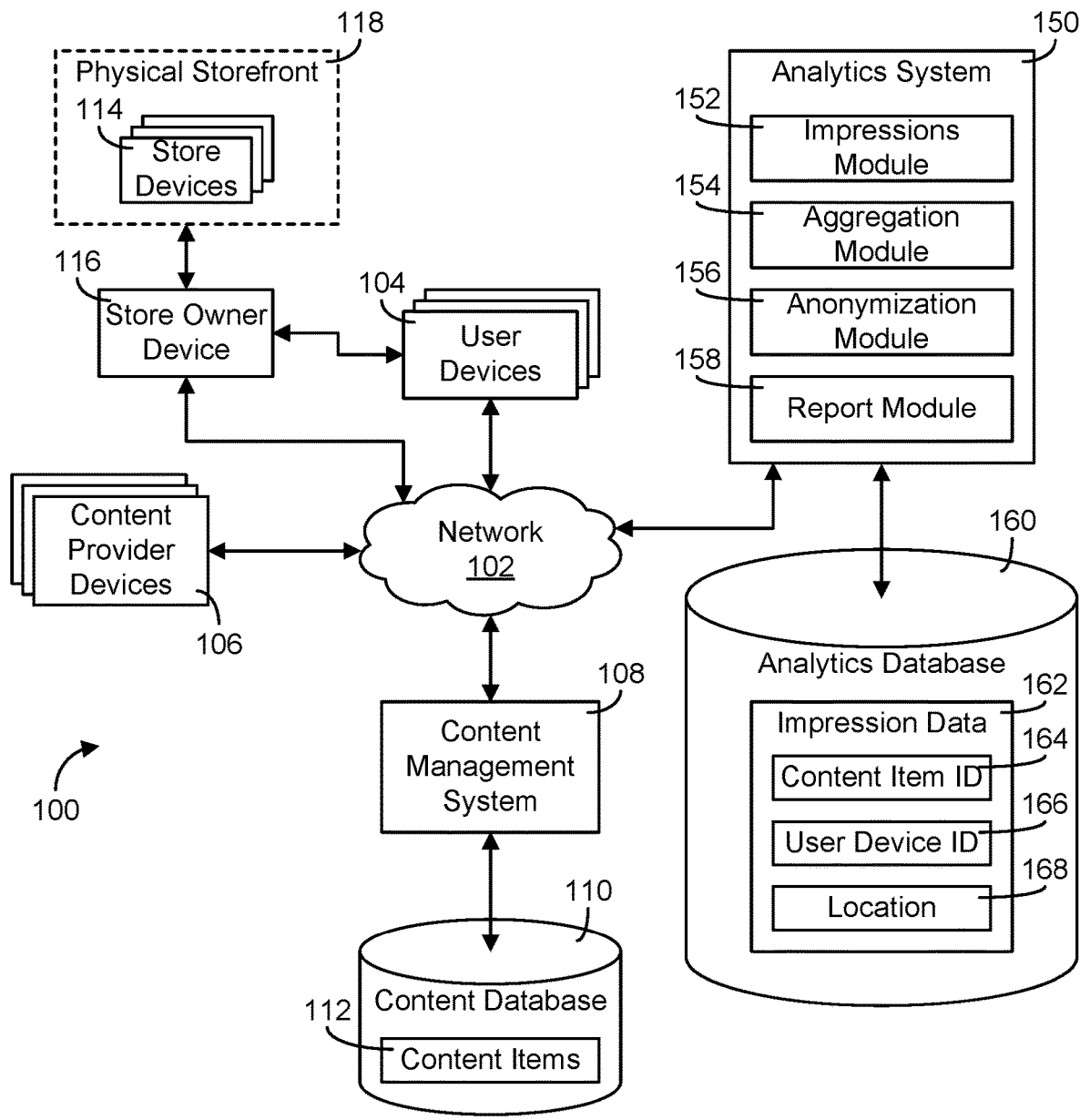
FIG. 1 is a block diagram of an analytics system and associated environment according to an illustrative implementation.

Following below are more detailed descriptions of various concepts related to, and implementations of, methods, apparatuses, and systems for providing information using a computer network. The various concepts introduced above and discussed in greater detail below may be implemented in any of numerous ways as the described concepts are not limited to any particular manner of implementation. Examples of specific implementations and applications are provided primarily for illustrative purposes.

Referring generally to the figures, various illustrative systems and methods are provided for providing content to a user on a user device based on the physical storefronts that the user visits. The systems and methods described herein allow for store owners and third-party content providers to provide content to visitors of a physical storefront.

In a physical storefront, one or more store devices may be deployed. The store devices may be, for example, beacons or WiFi routers. In some implementations, the store may include WiFi routers that generally provide a wireless network for surrounding user devices. In the systems and methods described herein, the WiFi routers or other store devices are used to push a signal to user devices in range of the devices. The signal may include a store identifier or other information that identifies the store to the user device. The store devices may then be configured not to receive a response or other information from the user device after pushing the signal.

The user device (e.g., a smartphone), and more particularly an application on the user device, may receive the signal and create store visit data for the user device. The store visit data may generally relate to a plurality of stores and other locations from which the user devices has visited and received a signal. For example, the store data may include store identifiers from a plurality of stores that the user of the user device has visited, along with other time data representing times associated with the visits. The collection of the store visit data occurs at the user device instead of via the store devices (e.g., WiFi routers), ensuring privacy between the store devices and the users. In some implementations, the only interaction between the store devices and the user device is when a store device pushes a message to the user device. In other implementations, the store devices and user device may also engage in typical WiFi communication as well.

Further, the store visit data may not be transmitted to a server or other remote device. More particularly, the store visit data is not transmitted to a server or remote device configured to provide content items to the user device. In other words, the store visit data may be maintained at the user device without ever being shared. The user may "opt-out" and erase the store visit data, in some implementations.

Store owners may provide store identifiers (e.g., beacon IDs or MAC addresses of one or more store devices) to a third-party content provider. The third-party content provider may use the store identifiers to select content to provide to one or more user devices. For example, based on the store identifiers, the third-party content provider may provide content to user devices based on the stores the user devices has visited. In some implementations, the third-party content provider may transmit content to all devices in a given area (e.g., all devices in a city or other large area). The user device may receive the content and compare a store identifier associated with the content with store visit data stored on the user device. If there is a match (e.g., a store identifier within the store visit data matches the store identifier associated with the content), the content may be displayed on the user device.

For many user devices, the content items received from the third-party content provider may be dismissed/ignored because the store identifier of the content item does not match a store identifier stored in the store visit data. There is no record of the user visiting the store associated with the received content items on the user device; therefore the content item is not displayed. In some implementations, only users who have opted into the service and have the store identifier of the content item stored on the user device in their list of visited stores may present the content item to the user.

The systems and methods described herein allow for minimal required setup from the store owner to facilitate the process. For example, instead of the store owner installing beacons or providing special setup for the WiFi routers (to cause the store devices to detect user devices and collect information from the user devices), the store devices may simply push a signal to the user devices. The user devices and analytics server may then be used to carry out the systems and methods described herein.

For situations in which the systems discussed herein collect and/or utilize personal information about users, or may make use of personal information, the users may be provided with an opportunity to control whether programs or features may collect personal information (e.g., information about a user's social network, social actions or activities, a user's preferences, a user's current location, etc.), or to control whether and/or how to receive content from the content server that may be more relevant to the user. In addition, certain data may be anonymized in one or more ways before it is stored or used, so that personally identifiable information is removed when generating parameters (e.g., demographic parameters). For example, a user's identity may be anonymized so that no personally identifiable information can be determined for the user, or a user's geographic location may be generalized where location information is obtained (such as to a city, ZIP code, or state level), so that a particular location of a user cannot be determined. Thus, the user may have control over how information is collected about him or her and used by a content server. Further, the individual user information itself is not surfaced to the content provider, so the content provider cannot discern the interactions associated with particular users. The use of user information by the systems and methods herein are described in greater detail below.

Referring now to FIG. 1, and in brief overview, a block diagram of an analytics system 150 and associated environment 100 is shown according to an illustrative implementation. One or more user devices 104 may be used by a user to perform various actions and/or access various types of content, some of which may be provided over a network 102 (e.g., the Internet, LAN, WAN, etc.). For example, user devices 104 may be used to access websites (e.g., using an Internet browser), media files, and/or any other types of content. A content management system 108 may be configured to select content for display to users within resources (e.g., webpages, applications, etc.) and to provide content items 112 from a content database 110 to user devices 104 over network 102 for display within the resources. The content items from which content management system 108 selects may be provided by one or more content providers via network 102 using one or more content provider devices 106. In some implementations, bids for content to be selected by content management system 108 may be provided to content management system 108 from content providers participating in an auction. In such implementations, content management system 108 may determine content to be published in one or more content interfaces of resources (e.g., webpages, applications, etc.) shown on user devices 104 based at least in part on the bids.

Environment 100 is shown to include a physical storefront 118 (e.g., a store). When a user of user device 104 is visiting physical storefront 118 (e.g., when a user is visiting a store), the user device may be near one or more store devices 114 installed within or near the physical storefront. When near a store device 114, user devices 104 may receive a signal from the store device. Store devices 114 may generally be configured to push signals to user devices 104. Further, store devices 114 may generally facilitate wireless communication between devices in physical storefront 118. For example, store devices 114 may be WiFi routers that can be used to create a local wireless network allowing devices within physical storefront 118 to communicate with one another or with a remote source. As another example, store devices 114 may be or serve as beacons transmitting signals to nearby devices (without the capability to receive signals from other devices). Environment 100 is further shown to include a store owner device 116 for a store owner of physical storefront 118 (or administrator or other user associated with the store). Store owner device 116 may also connect to the other devices and systems over network 102.

An analytics system 150 may be configured to receive information from one or more user devices 104 or store owner devices 116. Analytics system 150 may, for example, aggregate and anonymize information from the one or more user devices, and use the information to provide analytic information for content provider devices 106 or store owner devices 114. Analytics system 150 may store analytics information in an analytics database 160, in some implementations.

Referring in greater detail to FIG. 1, user devices 104, content provider devices 106 and/or store owner devices 116 may be any type of computing device (e.g., having a processor and memory or other type of computer-readable storage medium), such as a television and/or set-top box, mobile communication device (e.g., cellular telephone, smartphone, etc.), computer and/or media device (desktop computer, laptop or notebook computer, netbook computer, tablet device, gaming system, etc.), or any other type of computing device. In some implementations, one or more user devices 104 may be set-top boxes or other devices for use with a television set. In some implementations, content may be provided via a web-based application and/or an application resident on a user device 104. In some implementations, user devices 104 and/or content provider devices 106 may be designed to use various types of software and/or operating systems. In various illustrative implementations, user devices 104 and/or content provider devices 106 may be equipped with and/or associated with one or more user input devices (e.g., keyboard, mouse, remote control, touchscreen, etc.) and/or one or more display devices (e.g., television, monitor, CRT, plasma, LCD, LED, touchscreen, etc.).

User devices 104, content provider devices 106 and/or store owner devices 116 may be configured to receive data from various sources using a network 102. In some implementations, network 102 may include a computing network (e.g., LAN, WAN, Internet, etc.) to which the devices may be connected via any type of network connection (e.g., wired, such as Ethernet, phone line, power line, etc., or wireless, such as WiFi, WiMAX, 3G, 4G, satellite, etc.). In some implementations, network 102 may include a media distribution network, such as cable (e.g., coaxial metal cable), satellite, fiber optic, etc., configured to distribute media programming and/or data content.

Content management system 108 may be configured to conduct a content auction among third-party content providers to determine which third-party content is to be provided to a user device 104. For example, content management system 108 may conduct a real-time content auction in response to a user device 104 requesting first-party content from a content source (e.g., a website, search engine provider, etc.) or executing a first-party application. Content management system 108 may use any number of factors to determine the winner of the auction. For example, the winner of a content auction may be based in part on the third-party content provider's bid and/or a quality score for the third-party provider's content (e.g., a measure of how likely the user of the user device 104 is to click on the content). In other words, the highest bidder is not necessarily the winner of a content auction conducted by content management system 108, in some implementations.

Content management system 108 may be configured to allow third-party content providers to create campaigns to control how and when the provider participates in content auctions. A campaign may include any number of bid-related parameters, such as a minimum bid amount, a maximum bid amount, a target bid amount, or one or more budget amounts (e.g., a daily budget, a weekly budget, a total budget, etc.). In some cases, a bid amount may correspond to the amount the third-party provider is willing to pay in exchange for their content being presented at user devices 104. In some implementations, the bid amount may be on a cost per impression or cost per thousand impressions (CPM) basis. In further implementations, a bid amount may correspond to a specified action being performed in response to the third-party content being presented at a user device 104. For example, a bid amount may be a monetary amount that the third-party content provider is willing to pay, should their content be clicked on at the client device, thereby redirecting the client device to the provider's webpage or another resource associated with the content provider. In other words, a bid amount may be a cost per click (CPC) bid amount. In another example, the bid amount may correspond to an action being performed on the third-party provider's website, such as the user of the user device 104 making a purchase. Such bids are typically referred to as being on a cost per acquisition (CPA) or cost per conversion basis.

A campaign created via content management system 108 may also include selection parameters that control when a bid is placed on behalf of a third-party content provider in a content auction. If the third-party content is to be presented in conjunction with search results from a search engine, for example, the selection parameters may include one or more sets of search keywords. For instance, the third-party content provider may only participate in content auctions in which a search query for "golf resorts in California" is sent to a search engine. Other illustrative parameters that control when a bid is placed on behalf of a third-party content provider may include, but are not limited to, a topic identified using a device identifier's history data (e.g., based on webpages visited by the device identifier), the topic of a webpage or other first-party content with which the third-party content is to be presented, a geographic location of the client device that will be presenting the content, or a geographic location specified as part of a search query. In some cases, a selection parameter may designate a specific webpage, website, or group of websites with which the third-party content is to be presented. For example, an advertiser selling golf equipment may specify that they wish to place an advertisement on the sports page of a particular online newspaper.

In some implementations, the campaign created via content management system 108 may include one or more parameters related to a geographic location. For example, a campaign may be created in which the third-party content provider wishes to provide a content item for display on user devices in a particular location (e.g., a particular city, location, or other region). In such a campaign, content management system 108 may receive instructions from a store owner device 116 to provide a content item relating to a store to all users in a given location that are interested in the store. For example, the store owner may wish to provide content to users who have recently visited their store. The campaign may include transmitting the content item to the user devices in the given location, and the user devices may include an application for determining whether to display the content item. In other words, the campaign may transmit the content items without regard for which user devices will display the content item, therefore allowing the user devices to control what is displayed. In various implementations, the features as described above may be implemented in conjunction with such a campaign (e.g., third-party content providers may bid for the right to execute such a campaign, and various metrics may be used by content management system 108 to determine which content items to transmit).

In some implementations, after transmission of the content items to the plurality of user devices, content provider device 106 (or another remote system) may receive information relating to the effectiveness of the campaign (e.g., how many user devices chose to display the content item). In other implementations, content provider device 106 may not receive any indication to the display of the content items or the effectiveness of the campaign.

Referring further to FIG. 1, the activities of analytics system 150 is described in further detail. Analytics system 150 may receive and analyze data from user devices 104, content provider devices 106, store owner device 116, and various other sources via network 102 and provide analytics information for the content provider devices and store owner devices relating to user activity. Analytics system 150 may include one or more processors (e.g., any general purpose or special purpose processor), and may include and/or be operably coupled to one or more memories (e.g., any computer-readable storage media, such as a magnetic storage, optical storage, flash storage, RAM, etc.). In various implementations, analytics system 150 may be implemented as a separate system or may be integrated with another system within environment 100 (e.g., content management system 108). While analytics system 150 is described as a system receiving information from a plurality of devices, in some implementations of the present disclosure, analytics system 150 may not receive any information from user devices 104.

Analytics system 150 may include one or more modules (e.g., implemented as computer-readable instructions executable by a processor) configured to perform various functions. Analytics system 150 includes an impressions module 152 configured to determine a number of impressions of a content item on a user device 104. User device 104 may display a content item for which a store identifier associated with the content item matches a store identifier stored in store visit data of the user device (as described in greater detail in FIG. 2). In some implementations, user device 104 may then provide an indication that the content item was displayed on the user device to analysis system 150. Analysis system 150 may then provide an indication to the third-party content provider (e.g., via content management system 108 or content provider device 106) that the content item was viewed on the user device.

User device 104 may be configured to transmit an indication that a content item was viewed. User device 104 may choose to anonymize (or partially anonymize) the indication. For example, user device 104 may transmit a random user device identifier. The random user device identifier may then be stored as part of impression data in analytics database 160. User device 104 may use the same random user device identifier for multiple transmissions, allowing impressions module 152 to determine all content item impressions on a particular user device, without knowing the identity or other information relating to the user or user device. In some implementations, user device 104 may not transmit a user device identifier, only allowing impressions module 152 to aggregate a total amount of impressions of content items. In other implementations, user device 104 may transmit a user device identifier, and impressions module 152 may anonymize the user device identifier before storage in analytic database 160.

Impressions module 152 may be configured to transmit impression data to the third-party content provider, either via request from the third-party content provider or upon receiving sufficient impression data from a plurality of user devices. Impressions module 152 may be configured to partially or wholly anonymize impression data before transmission to the third-party content provider. For example, impressions module 152 may provide a total number of content item impressions, a total number of unique impressions (e.g., total number of user devices displaying the content item), time-related information (e.g., when the content item was viewed), etc.

Analytics system 150 includes an aggregation module 154 configured to aggregate impression data from a plurality of user devices 104. An individual user device 104 may receive or generate impression data relating to one or more impressions of a content item on the user device, and may transmit the impression data to analytics system 150. Aggregation module 154 may receive impression data for a plurality of user devices 104. The impression data may include, for example, a timestamp (or other information that indicates when a content item was viewed at the user device). The impression data may further include a user device type indicating a platform (e.g., browser, app, etc.) on which the content item was displayed and a type of user device (e.g., tablet, smartphone, etc.) on which the content item was displayed. The impression data may further include a location of the user device at the time of the impression of the content item. In some implementations, some or all of the impression data may be anonymized by user device 104 before transmission to analytics system 150. Aggregation module 154 may store the received impression data in analytics database 160. The stored data may then be used to generate analytics data for a store owner or other user.

Analytics system 150 includes an anonymization module 156 configured to anonymize the impression data. Anonymization module 156 may anonymize the impression data in any way. For example, a user device identifier may be removed from the impression data, so that analytics system 150 does not know from which user device a particular impression originated. As another example, the subject of the content item (e.g., a content item relating to a type of store such as a restaurant, grocery store, clothing store, electronics store, etc.) may be removed from the impression data, so that analytics system 150 does not know the particular shopping habits of a user device associated with the impression data. As another example, a location (e.g., geo-location) may be removed from the impression data, such that analytics system 150 does not know where a user device associated with the impression data is located. Anonymization module 156 may be configured to wholly or partially anonymize the impression data (e.g., either completely removing location information or generalizing the location information to a single city or state). Anonymization module 156 may anonymize impression data as the data is received from user devices 104, or may anonymize impression data already stored in analytics database 160. For example, anonymization module 156 may anonymize impression data upon receiving a request for the impression data from a store owner device 116.

As described above, in addition to or instead of anonymization module 156 anonymizing data, user devices 104 may be configured to anonymize the impression data before transmitting the data to analytics system 150. For example, user devices 104 may anonymize any aspect of the impression data that the user does not wish to share with analytics system 150.

Analytics system 150 includes a report module 158 configured to generate analytics information for store owner device 116. In some implementations, when a store owner wishes to view analytics data relating to his or her store, store owner device 116 may transmit information to report module 158. The information may include a store identifier or other identifier that may be used to identify one or more content items related to the store and store owner. Using the information, report module 158 may identify impression data relating to one or more content items relating to the store or store owner. The matching impression data may then be aggregated (and anonymized by module 156 if necessary) and provided to store owner device 116. The aggregated data generally indicates to the store owner how many user devices displayed a content item for a user, how many user devices completed an action (e.g., click-through, conversion, etc.) related to the display of the content item, and other performance statistics of the content item. The report may be provided to store owner device 116 in any format (e.g., webpage, spreadsheet, or any other type of file or format).

Analytics database 160, as described above, may receive impression data 162 from analytics system 150. Impression data 162 may include a content item identifier 164 that identifies the content item related to the impression data. Impression data 162 may further include a user device identifier 166. User device identifier 166 may be used to identify a user device 104 which viewed the content item. User device identifier 166 may be a random identifier chosen by user device 104, allowing analytics system 150 to identify all impression data coming from a particular user device without being able to identify information about the user device. Impression data 162 may further include location data 168, identifying a location associated with the user device (e.g., a city, an address, etc.).

In various implementations of the present disclosure, impression data is stored in analytics database 160. In various implementations, the data may be retrieved from any source or combination of sources, or may not be stored and is only used when the data is received from user devices 104. Further, the data may be stored in any format within analytics database 160 or any other data storage device. Analytics database 160 is provided as an example data storage by way of example only.

Figure 2:
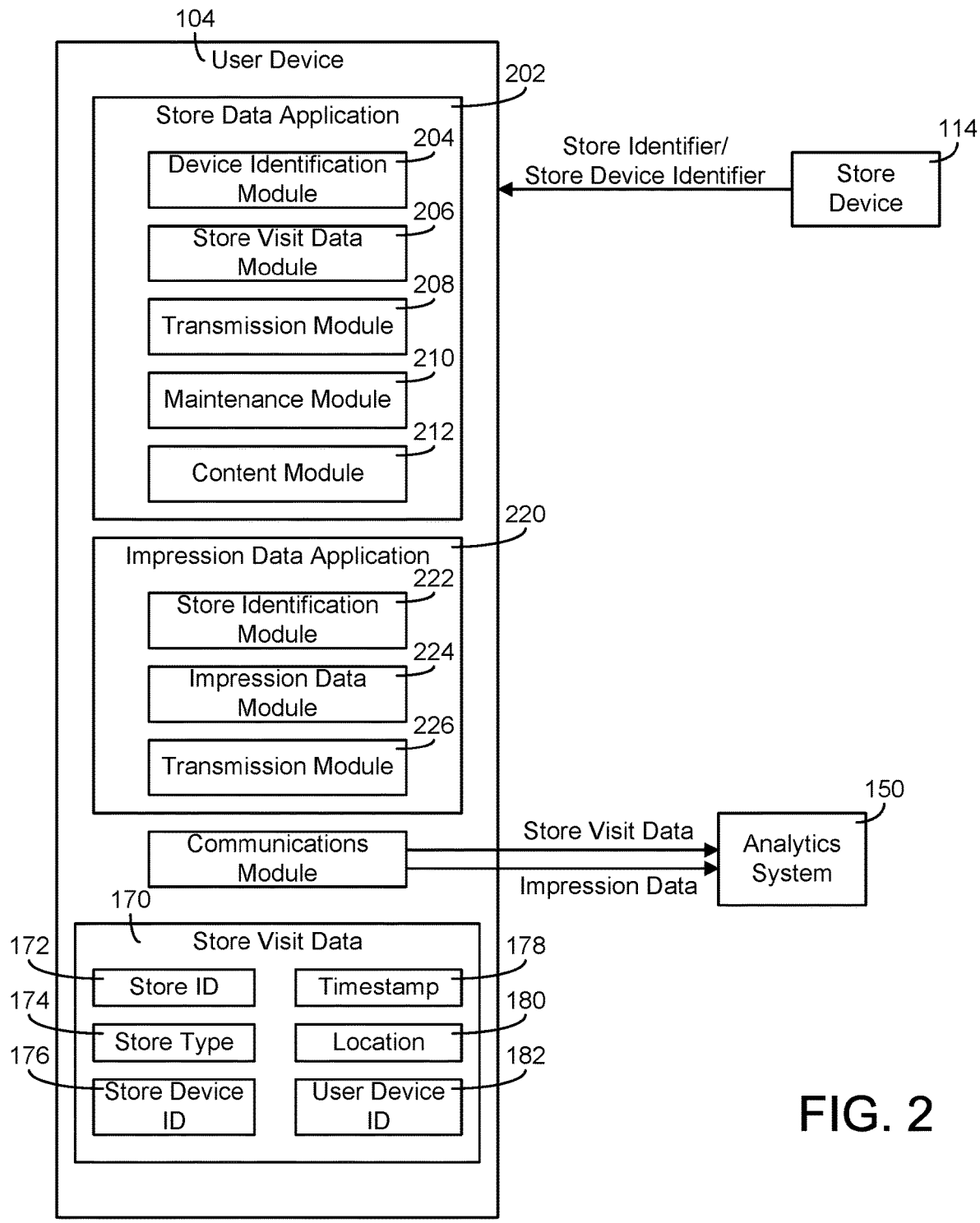
FIG. 2 is a block diagram of a store data application of the user device of FIG. 1 according to an illustrative implementation.

Referring now to FIG. 2, the activities of a user device 104 is described in greater detail. As described above, user device 104 may include an application configured to generate impression data and store visit data, to store and maintain the data, and to transmit the data to an analytics system 150.

User device 104 may generate store visit data when in the presence of one or more store devices 114 in a physical storefront 118 that are configured to transmit signals to the user device. A physical storefront may include one or more store devices 114 located in various locations, configured to provide various wireless network features for devices in the area. For example, store devices 114 may include WiFi routers configured to provide access to a wireless network to one or more devices. As another example, store devices 114 may include one or more beacons configured to transmit low energy signals to one or more devices. Store devices 114 may be any type of device configured for wireless communications with other devices and may be located in various locations in physical storefront 118 to provide wireless network coverage for part or all of the area.

In some implementations, store devices 114 may be configured to push a signal to one or more user devices 104. The signal may include an identifier, such as a store identifier (identifying the particular store the user device is at) or a store device identifier (e.g., a MAC address or other identifier that specifically identifies a store device). A user device 104 may receive the transmitted signal including the identifier. Store devices 114 may be configured not to have further communication with user devices 104 and/or not to collect information from user devices 104, in some implementations. For example, store devices 114 may push the signals to the one or more user devices, and the user devices may use the information from the signal without any communication back to the store devices. In other words, store devices 114 may push information to user devices 104 without receiving any feedback or further information from user devices 104, in some implementations.

User device 104 is shown to include a store data application 202 configured to receive, generate, and maintain store visit data. For example, store data application 202 may receive a signal from a store device 114, extract a store identifier or store device identifier from the signal, store the identifier as part of store visit data, and transmit the store visit data to a remote server (e.g., analytics system 150). Store data application 202 includes an device identification module 204 configured to extract identification information from a received signal. For example, when user device 104 receives a pushed signal from a store device 114, device identification module 204 may determine identification information of the device and/or the store from which the signal was transmitted. The identification information may include, for example, a MAC address of a WiFi router, a beacon identifier, a store name or other identifier, etc.

Store data application 202 includes a store visit data module 206 configured to generate store visit data 170 upon receiving the signal from a store device 114. Store visit data 170 may generally relate to data stored by a user device 104 when the user device receives a signal from a store device 114 in a physical storefront 118. Store visit data 170 may include a store identifier 172 (e.g., a name of the store or other identifier that identifies a specific store and store location). Store visit data 170 may include a store type 174. For example, the store may be a retail store, restaurant, grocery store, electronics store, etc. Store type 174 may be of any granularity (e.g., the store type may be simply be "restaurant" or further identify the type of food at the restaurant). Store visit data 170 may include a store device identifier 176. Store device identifier 176 identifies a particular device within the physical storefront that transmitted the signal to the user device that triggered the process of creating store visit data. Store visit data 170 further includes a timestamp 178 that identifies a time at which the store visit data was created. Timestamp 178 may indicate a specific time, a specific day, a time of day, or any other period of time. Store visit data 170 may further include location 180. Location 180 may identify a specific location of the store (e.g., an address of the physical storefront) or a more general location (e.g., a city, state, or other region at which the physical storefront is located). Store visit data 170 may further include user device identifier 182. User device identifier 182 may be used to identify a user device 104 from which the store visit data originated. User device identifier 182 may be a random identifier chosen by user device 104, allowing analytics system 150 to identify all store visit data coming from a particular user device without being able to identify information about the user device.

In some implementations, store visit data module 206 may anonymize the store visit data. For example, one or more of a store identifier, store device identifier, the type of store, a timestamp, or a location may be anonymized before storing the store visit data. Anonymizing the store visit data allows the user and user device not to be identified by an analytics system 150 if or when store visit data is transmitted to the analytics system.

Store data application 202 includes a transmission module 208 configured to facilitate the transmission of store visit data to a remote server (e.g., analytics system 150). In some implementations, user device 104 may be configured to periodically transmit store visit data (e.g., once a day, once a week, etc.) to analytics system 150. In some implementations, user device 104 may transmit store visit data to analytics system 150 based on the amount of store visit data generated at the user device. For example, transmission module 208 may wait until one thousand locations have been visited (with store visit data being generated for each visit) before sending the store visit data to analytics system 150. In some implementations, before transmitting the store visit data, some or all of the store visit data may be anonymized by store visit data module 206. For example, once one thousand locations have been visited and a transmission is initiated, store visit data module 206 may scrub all timestamp information from the data before transmission to analytics system 150.

In some implementations, user device 104 may be configured not to share store visit data with some or all devices, and may not include a transmission module 208. For example, user device 104 may be configured not to share store visit data with any other device, and may only use the store visit data to determine which content items to display on the user device. As another example, user device 104 may be configured to only share the store visit data with a remote server such as analytics system 150. User device 104 may be configured not to ever share store visit data with store devices 114, in some implementations.

Store data application 202 may include a maintenance module 210 configured to maintain store visit data in memory of user device 104. For example, a user may choose to "opt out" of receiving signals from a store device 114 (e.g., from a store device for a particular physical storefront, or from all physical storefronts). Maintenance module 210 may be configured to erase all store visit data stored on user device 104 in such a scenario. As another example, maintenance module 210 may be configured to erase "old" store visit data (e.g., store visit date created longer than a threshold date and time ago, such as store visit data over a year old).

User device 104 is shown to include an impression data application 220 configured to receive, generate, and maintain content item impression data. For example, upon receiving a content item for display, impression data application 220 may determine an identifier associated with the content item, compare the identifier to store visit data, and determine whether to provide the content item for display on the user device. Impression data application 220 includes a store identification module 222 configured to compare a store identifier associated with the content item with store visit data. For example, when a third-party content provider provides a content item for display, an identifier may be included. Store identification module 222 may determine the identifier and compare the identifier with the store visit data to determine a match.

In some implementations, the identifier associated with the content item may be a store identifier (e.g., a store name, store type, etc.). Store identification module 222 may compare the store identifier to store visit data 162, and more particularly store identifier 164 and store type 166, to determine if there is a match. In some implementations, the identifier associated with the content item may be a store device identifier (e.g., a MAC address, beacon identifier, etc.). Store identification module 222 may compare the store device identifier to store visit data 162, and more particularly store device identifier 168, to determine if there is a match.

Impression data application 220 includes an impression data module 224. If there is a match between the content item identifier and the store visit data, the content item may be presented for display on user device 104. Impression data module 224 may be configured to generate impression data relating to the display of the content item. Impression data may generally include what platform (e.g., browser, etc.) on which the content item was displayed, an amount of time the content item was displayed, any user interaction with the content item (e.g., clicking or selecting the content item), and other such information. In some implementations, impression data module 224 may partially or wholly anonymize impression data.

Impression data application 220 includes a transmission module 226 configured to facilitate the transmission of impression data to a remote server (e.g., analytics system 150). In various implementations, user device 104 may be configured to transmit impression data periodically or upon generation of impression data for an individual impression. Transmission module 226 may be configured to anonymize impression data as generally described in the present disclosure (e.g., by removing timestamp information, by transmitting a random device identifier or no device identifier, etc.).

While store data application 202 and impression data application 220 are described as applications for a mobile device for carrying out the activities described in the present disclosure, it should be understood that such activities may be carried out by another component of the operating system of the mobile device, and the description of the application on the mobile device is not limiting.

Figure 3:
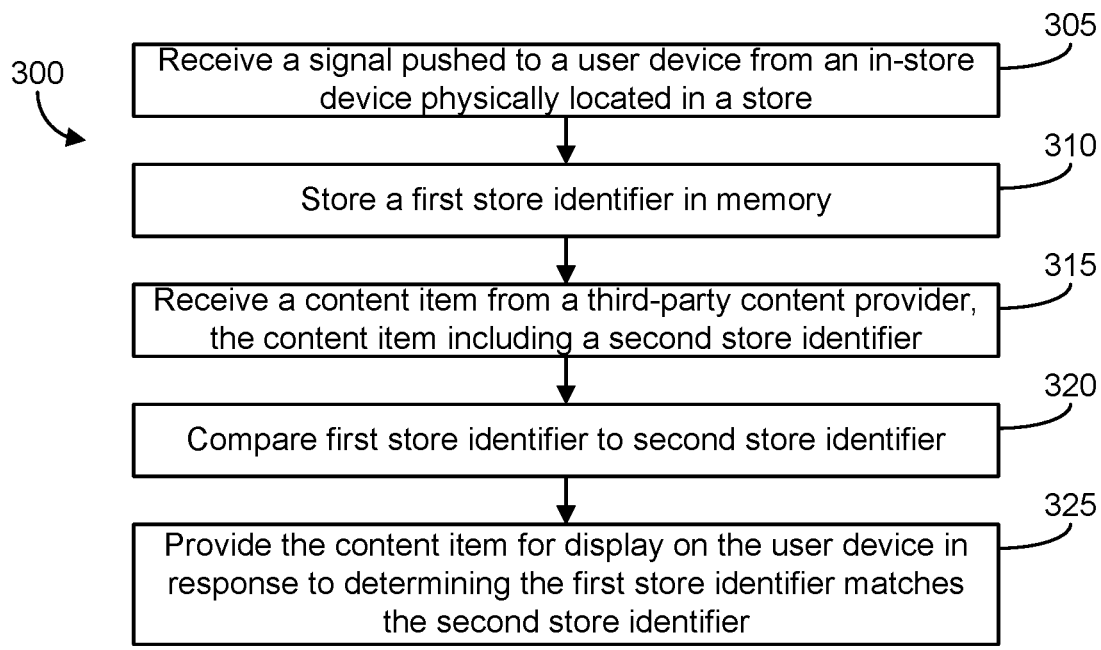
FIG. 3 is a flow diagram of a process for displaying a content item on a user device according to an illustrative implementation.

Referring now to FIG. 3, a flow diagram of a process 300 for displaying a content item on a user device is shown according to an illustrative implementation. Process 300 may be executed by, for example, user device 104 and more particularly store data application 202 and impression data application 220 as described with reference to FIGS. 1-2. Process 300 may be executed when the user device (and user of the user device) is present at a physical storefront including a plurality of store devices configured to push signals to the user devices, and later when the user device receives content transmitted from a third-party content provider.

Process 300 includes receiving a signal pushed to the user device from an in-store device physically located in a store (305). In some implementations, store devices may include WiFi routers. In addition to providing wireless communications to the physical storefront, WiFi routers may be configured to push signals to the user device. In other implementations, store devices may include beacons configured to push signals to the user device.

The signals pushed to the user device may include one or more identifiers. For example, if the store device is a WiFi router, the signal may include a MAC address or other identifier that identifies the specific WiFi router that pushed the signal. As another example, if the store device is a beacon, the signal may include a beacon identifier of the beacon that pushed the signal. The identifier may further include, for example, a store identifier (e.g., store name). The signal may further include any information that allows a remote server to identify the origin of the signal (and therefore, the location of the user device).

Process 300 further includes storing the first store identifier in memory (310). In some implementations, the first store identifier may be stored as part of store visit data. The store visit data may include time data representing a time associated with the receipt of the signal from the store device and any other data relating to the receipt of the signal (e.g., the type of store, store location, etc.). The first store identifier may include a store identifier (identifying the physical storefront), a store device identifier (identifying a specific store device), or may include both.

Process 300 further includes receiving a content item from a third-party content provider device (315). In various implementations, a third-party content provider device may be configured to transmit a content item to a plurality of user devices in a given geographic area (e.g., in a city, in a physical storefront, or in any size region). The third-party content provider device may transmit additional information along with the content item. For example, the content item may include a second store identifier. The second store identifier may identify a physical storefront or one or more store devices within the physical storefront. In some implementations, the geographic area to which the content item is transmitted may be chosen based on the second store identifier (e.g., to a geographic area surrounding the physical storefront associated with the second store identifier).

In some implementations, the second store identifier transmitted with the content item may be an identifier provided by a store owner device and/or determined by the third-party content provider device. For example, in one implementation, a store owner may wish to provide a content item to all user devices that have recently visited their physical storefront, or may wish to provide a content item to a number of user devices as part of a content item campaign (i.e., the store owner has "won" an auction for providing a content item to one or more user devices). In such an implementation, the store owner device may transmit a store device identifier of a particular store device as the second store identifier. The store device may be a store device configured to push signals to user devices at the physical storefront. As another example, the store owner device (or third-party content provider device) may determine a store identifier that identifies the physical storefront in general.

In an alternative implementation, the user device may be configured to transmit store visit data to an analytics system, and the analytics system may cause the content item to be transmitted from the third-party content provider device to the user device. For example, if a store identifier in the store visit data matches a store identifier associated with a content item, the analytics system may cause the content item to be transmitted. In such an embodiment, the content item, instead of being transmitted to all user devices in an area, may only be transmitted to user devices for which a store identifier sent to the analytics system matches the store identifier associated with the content item. Such an implementation may only be implementable if the user device allows transmission of the store visit data to the analytics system.

Process 300 further includes comparing the first store identifier to the second store identifier (320). In some implementations, the comparison may include determining if the first store identifier and the second store identifier match. For example, the first store identifier and second store identifier may both be identifiers for a particular store device within a physical storefront. In other implementations, block 320 may include any type of comparison based on to what store device the first store identifier and second store identifier is related. For example, the first store identifier may identify a first store device in a physical storefront and the second store identifier may identify a second store device in the same physical storefront. As another example, one of the first store identifier and second store identifier may identify a store device while the other one simply identifies the physical storefront. Block 320 may include any type of comparison that allows the user device to determine if there is a match or partial match between the two store identifiers. In some implementations, the store device identifiers may be considered to match if it is determined both identifiers are associated with a same store owner, brand, corporation, etc. Process 300 further includes providing the content item for display on the user device in response to determining the first store identifier matches the second store identifier (step 325). If the first store identifier and second store identifier do not match, the content item is discarded.

Blocks 320, 325 may generally be executed to show content items that the user of the user device may be interested in viewing. For example, at block 320, the user device determines if the content item is generally related to a physical storefront that the user device has visited. If the content item is indeed related to store visit data stored in the user device, the content item may be displayed for the user. The content item may be displayed on the user device without the knowledge of the store owner device or third-party content provider device. Since the third-party content provider device merely transmits the content item, and the store owner device simply transmits a store device identifier or other identifier, neither device may be aware of the decision of the user device of whether to display the content item.

In some implementations, the user device may choose to "opt in" or "opt out" of receiving content items from a third-party content provider device. If the user devices chooses to "opt out" of receiving such content items, the user device may then delete all first store identifiers (and store visit data) from memory of the user device. In other words, the user device may choose to delete (or otherwise modify) the store visit data and store identifiers of the store visit data to prevent any content items from the third-party content provider device from being displayed on the user device.

Figure 4:
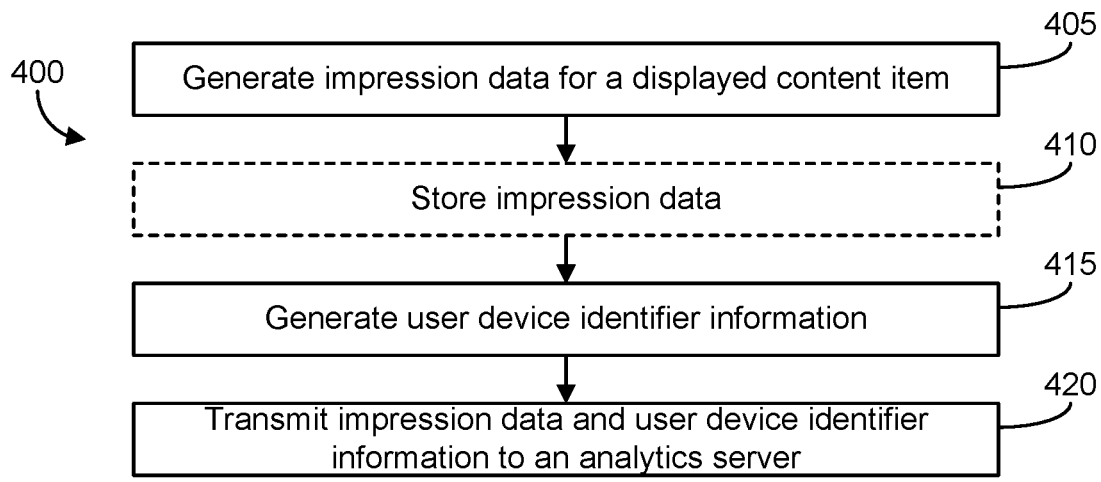
FIG. 4 is a flow diagram of a process for reporting a content item impression on a user device according to an illustrative implementation.

Referring now to FIG. 4, a flow diagram of a process 400 for reporting a content item impression on a user device is shown according to an illustrative implementation. Process 400 may be executed by, for example, user device 104 once a content item has been provided for display on the user device. For example, referring also to process 300, process 400 may be executed upon determining that the content item received by the user device should be provided for display. Process 400 may generally include providing an indication of an impression of the content item. It should be noted that while process 400 describes an impression of the content item, process 400 may be adapted to provide any other type of metric (e.g., click, conversion, etc.) associated with the display of the content item.

It should be understood that in some implementations, the user device may be configured not to share any impression data with a remote system. In such implementations, the user device may not execute process 400 or any other sharing-related feature.

Process 400 includes generating impression data for a displayed content item (405). For example, block 405 may include determining if the content item was properly displayed on a browser or application of the user device, if the user interacted with the content item in any way, etc. Process 400 may include storing the impression data (410). In some implementations, the user device may store impression data for transmission at a later time (e.g., aggregating impression data before transmission); in other implementations, the user device may not store impression data and may transmit impression data upon generation.

Process 400 further includes generating user device identifier information (415). The user device identifier information and impression data are then transmitted to an analytics system (or other remote system) (420). In some implementations, the user device identifier information may simply include a user device identifier that allows the analytics system to identify the user device transmitting the impression data.

In some implementations, the user device identification information may include a random user device identifier. The random user device identifier may be a random identifier that the user device uses for transmissions to the analytics server. The analytics server, upon receiving the random user device identifier, may be able to determine that multiple transmissions of impression data may be originating from the same user device (e.g., by comparing stored random user device identifiers with the newly received random user device identifier). This may allow the analytics server to determine if the same content item was displayed several times on the user device, may determine content item viewing habits or preferences of the user device, and the like. For example, the analytics server may be able to determine which types of content items the user device is choosing to display, which locations the user device frequents (based on the decision of which content items are displayed on the user device), and other such information that relates to the consumption of content item. However, because of the random user device identifier, the analytics server may still not be able to personally identify the user device.

In some implementations, the user device may simply not transmit a user device identifier with the impression data. This may prevent the analytics server from identifying any content item viewing habits from the user device. However, this also may prevent the analytics server from determining multiple impressions of a content item on a single user device.

The analytics server may aggregate and anonymize the impression data received from a plurality of user devices, and provide the aggregated impression data to a third-party content provider device or content management system. For example, the aggregated impression data may be provided in a report to the third-party content provider device to see how effective a campaign is. As another example, the aggregated impression data may be provided to the content management system and used for future bidding auctions and other decisions relating to the selection of content items.

Figure 5:
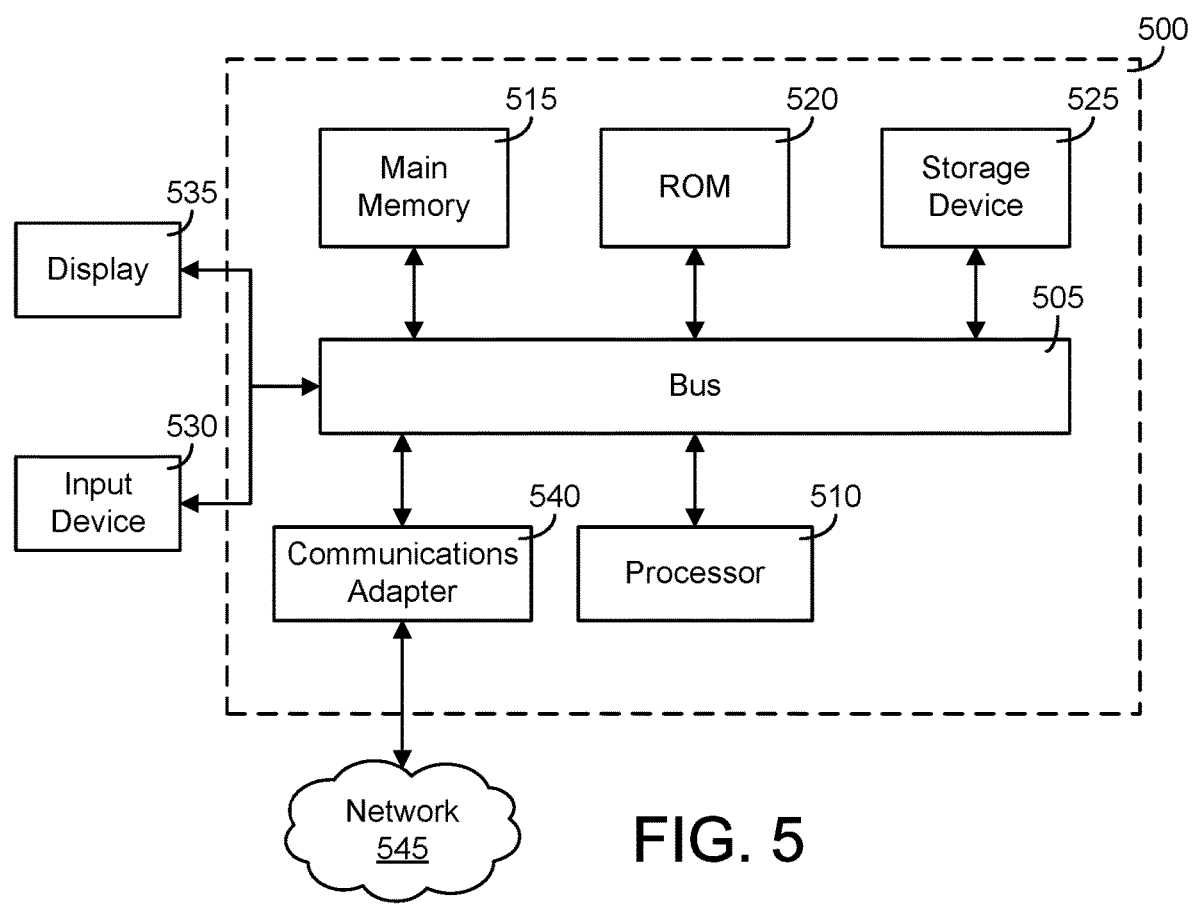
FIG. 5 is a block diagram of a computing system according to an illustrative implementation.

FIG. 5 illustrates a depiction of a computer system 500 that can be used, for example, to implement an illustrative user device 104, an illustrative content management system 108, an illustrative content provider device 106, an illustrative analytics system 150, and/or various other illustrative systems described in the present disclosure. Computing system 500 includes a bus 505 or other communication component for communicating information and a processor 510 coupled to bus 505 for processing information. Computing system 500 also includes main memory 515, such as a random access memory (RAM) or other dynamic storage device, coupled to bus 505 for storing information, and instructions to be executed by processor 510. Main memory 515 can also be used for storing position information, temporary variables, or other intermediate information during execution of instructions by processor 510. Computing system 500 may further include a read only memory (ROM) 520 or other static storage device coupled to bus 505 for storing static information and instructions for processor 510. A storage device 525, such as a solid state device, magnetic disk or optical disk, is coupled to bus 505 for persistently storing information and instructions.

Computing system 500 may be coupled via bus 505 to a display 535, such as a liquid crystal display, or active matrix display, for displaying information to a user. An input device 530, such as a keyboard including alphanumeric and other keys, may be coupled to bus 505 for communicating information, and command selections to processor 510. In another implementation, input device 530 has a touch screen display 535. Input device 530 can include a cursor control, such as a mouse, a trackball, or cursor direction keys, for communicating direction information and command selections to processor 510 and for controlling cursor movement on display 535.

In some implementations, computing system 500 may include a communications adapter 540, such as a networking adapter. Communications adapter 540 may be coupled to bus 505 and may be configured to enable communications with a computing or communications network 545 and/or other computing systems. In various illustrative implementations, any type of networking configuration may be achieved using communications adapter 540, such as wired (e.g., via Ethernet®), wireless (e.g., via WiFi®, Bluetooth®, etc.), pre-configured, ad-hoc, LAN, WAN, etc.

According to various implementations, the processes that effectuate illustrative implementations that are described herein can be achieved by computing system 500 in response to processor 510 executing an arrangement of instructions contained in main memory 515. Such instructions can be read into main memory 515 from another computer-readable medium, such as storage device 525. Execution of the arrangement of instructions contained in main memory 515 causes computing system 500 to perform the illustrative processes described herein. One or more processors in a multi-processing arrangement may also be employed to execute the instructions contained in main memory 515. In alternative implementations, hard-wired circuitry may be used in place of or in combination with software instructions to implement illustrative implementations. Thus, implementations are not limited to any specific combination of hardware circuitry and software.

The analytics system as described in the present disclosure may be implementable for any type of third-party content item. In one implementation, the content items may include advertisements. In one implementation, the content items may include any text, images, video, stories (e.g., news stories), social media content, links, or any other type of content provided by a third-party for display on the webpage of a first-party content provider. The type of content item for which the analytics system may be used is not limiting.

Although an example processing system has been described in FIG. 5, implementations of the subject matter and the functional operations described in this specification can be carried out using other types of digital electronic circuitry, or in computer software, firmware, or hardware, including the structures disclosed in this specification and their structural equivalents, or in combinations of one or more of them.

Implementations of the subject matter and the operations described in this specification can be carried out using digital electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on one or more computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, or other storage devices). Accordingly, the computer storage medium is both tangible and non-transitory.

The operations described in this specification can be implemented as operations performed by a data processing apparatus on data stored on one or more computer-readable storage devices or received from other sources.

The terms "data processing apparatus" or "computing device" encompass all kinds of apparatus, devices, and machines for processing data, including by way of example, a programmable processor, a computer, a system on a chip, or multiple ones, or combinations of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example, semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be carried out using a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be carried out using a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such backend, middleware, or frontend components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

In some illustrative implementations, the features disclosed herein may be implemented on a smart television module (or connected television module, hybrid television module, etc.), which may include a processing circuit configured to integrate Internet connectivity with more traditional television programming sources (e.g., received via cable, satellite, over-the-air, or other signals). The smart television module may be physically incorporated into a television set or may include a separate device such as a set-top box, Blu-ray or other digital media player, game console, hotel television system, and other companion device. A smart television module may be configured to allow viewers to search and find videos, movies, photos and other content on the web, on a local cable TV channel, on a satellite TV channel, or stored on a local hard drive. A set-top box (STB) or set-top unit (STU) may include an information appliance device that may contain a tuner and connect to a television set and an external source of signal, turning the signal into content which is then displayed on the television screen or other display device. A smart television module may be configured to provide a home screen or top level screen including icons for a plurality of different applications, such as a web browser and a plurality of streaming media services, a connected cable or satellite media source, other web "channels", etc. The smart television module may further be configured to provide an electronic programming guide to the user. A companion application to the smart television module may be operable on a mobile computing device to provide additional information about available programs to a user, to allow the user to control the smart television module, etc. In alternate implementations, the features may be implemented on a laptop computer or other personal computer, a smartphone, other mobile phone, handheld computer, a tablet PC, or other computing device.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be carried out in combination or in a single implementation. Conversely, various features that are described in the context of a single implementation can also be carried out in multiple implementations, separately, or in any suitable subcombination. Moreover, although features may be described above as acting in certain combinations and even initially claimed as such, one or more features from a claimed combination can, in some cases, be excised from the combination, and the claimed combination may be directed to a subcombination or variation of a subcombination. Additionally, features described with respect to particular headings may be utilized with respect to and/or in combination with illustrative implementations described under other headings; headings, where provided, are included solely for the purpose of readability and should not be construed as limiting any features provided with respect to such headings.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products embodied on tangible media.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method comprising:
receiving, at a user device comprising one or more processors and a memory, a signal from an entity device physically located in a first entity, the signal including an entity identifier;
generating, by the user device, a list of entities including the first entity using the signal and the associated entity identifier, the first entity of the list of entities determined to have been within a predetermined distance from the user device based on the signal received by the user device from the entity device located within the first entity;

storing, by the one or more processors of the user device, the list of entities in the memory of the user device;

receiving, at the user device, a content item from a third-party content provider device or a content management system, the content item including a content item identifier, the third-party content provider device or the content management system configured to transmit the content item to a plurality of user devices including the user device that are within a geographic area around a location associated with the entity identified by the content item identifier;

storing, by the one or more processors of the user device, the content item and the content item identifier in the memory of the user device;

determining, by the one or more processors of the user device, whether the entity identified by the content item identifier matches one or more entities included in the list of entities; and displaying, by the one or more processors of the user device, the content item responsive to the user device determining that the entity identified by the content item identifier matches the one or more entities included in the list of entities; or discarding, by the one or more processors of the user device, responsive to the user device determining that the entity identified by the content item identifier does not match any of the one or more entities included in the list of entities, the content item from the memory of the user device without displaying the content item.

2. The method of claim 1, further comprising:
receiving, at the user device, a second content item from a second third-party content provider device or the content management system, the second content item including a second content item identifier, the second third-party content provider device or the content management system configured to transmit the second content item to a second plurality of user devices within a second geographic area around a second location associated with the entity identified by the second content item identifier;

storing, by the one or more processors of the user device, the second content item and the second content item identifier in the memory of the user device;

comparing, by the one or more processors of the user device, the entity identified by the second content item identifier to the list of entities;

determining, by the one or more processors of the user device, that the entity identified by the second content item identifier does not match any of the one or more entities included in the list of entities; and discarding, by the one or more processors of the user device, responsive to determining that the entity identified by the second content item identifier does not match any of the one or more entities included in the list of entities, the second content item from the memory of the user device without displaying the second content item.

3. The method of claim 1, wherein the entity device comprises a wireless router.

4. The method of claim 1, wherein the entity device comprises a beacon.

5. The method of claim 1, further comprising:
receiving, at the user device, a user input for opting out of receiving content items; and
deleting all entity identifiers from the memory of the user device.

6. The method of claim 1, wherein receiving the content item further comprises receiving, at the user device, the content item responsive to receipt by the third-party content provider device or the content management system of an input from an administrator device associated with the entity identified by the content item identifier.

7. The method of claim 6, wherein the input from the administrator device comprises a beacon identifier.

8. The method of claim 6, wherein the input from the administrator device comprises a media access control (MAC) address of a wireless router.

9. The method of claim 1, further comprising:
sending, by one or more processors of the user device, an indication that the content item was displayed on the user device to an analytics server, wherein the analytics server is configured to determine a number of impressions of the content item over the plurality of user devices.

10. The method of claim 9, wherein the user device restricts information from which the analytics server can identify the user device or a user of the user device.

11. A system comprising:
a user device comprising one or more processors and a memory and configured to:
receive a signal from an entity device physically located in a first entity, the signal including an entity identifier;
generate a list of entities including the first entity using the signal and the associated entity identifier, the first entity of the list of entities determined to have been within a predetermined distance from the user device based on the signal received by the user device from the entity device located within the first entity;
store the list of entities in the memory of the user device;
receive a content item from a third-party content provider device or a content management system, the content item including a content item identifier, the third-party content provider device or the content management system configured to transmit the content item to a plurality of user devices including the user device that are within a geographic area around a location associated with the entity identified by the content item identifier;
store the content item and the content item identifier in the memory of the user device;
determine whether the entity identified by the content item identifier matches one or more entities included in the list of entities; and
display the content item responsive to the user device determining that the entity identified by the content item identifier matches the one or more entities included in the list of entities; or
discard, responsive to the user device determining that the entity identified by the content item identifier does not match any of the one or more entities included in the list of entities, the content item from the memory of the user device without displaying the content item.

12. The system of claim 11, wherein the user device is further configured to:
receive a second content item from a second third-party content provider device or the content management system, the second content item including a second content item identifier, the second third-party content provider device or the content management system configured to transmit the second content item to a second plurality of user devices within a second geographic area around a second location associated with the entity identified by the second content item identifier;

store the second content item and the second content item identifier in the memory of the user device;

compare the second content item identifier to the list of entities;

determine that the entity identified by the second content item identifier does not match any of the one or more entities included in the list of entities; and discard, responsive to determining that the entity identified by the second content item identifier does not match any of the one or more entities included in the list of entities, the second content item from the memory of the user device without displaying the second content item.

13. The system of claim 11, wherein the entity device comprises a wireless router.

14. The system of claim 11, wherein the entity device comprises a beacon.

15. The system of claim 11, wherein the user device is further configured to:

receive a user input for opting out of receiving content items; and delete all entity identifiers from the memory of the user device.

16. The system of claim 11, wherein the third-party content provider device or the content management system receives an input from an administrator device associated with the entity identified by the content item identifier, and wherein the content item transmitted to the user device is selected based at least in part on the input from the administrator device.

17. The system of claim 16, wherein the input from the administrator device comprises a beacon identifier.

18. The system of claim 16, wherein the entity device comprises a wireless router and wherein the input from the administrator device comprises a media access control (MAC) address of the wireless router.

19. The system of claim 11, wherein the user device is further configured to:

send an indication that the content item was displayed on the user device to an analytics server, wherein the analytics server is configured to determine a number of impressions of the content item over the plurality of user devices.

20. A method performed by an analytics server comprising:

receiving, from a user device, a log of content item impressions, the log of content item impressions generated by the user device responsive to presenting one or more content items on a display of the user device, each content item presented responsive to the user device matching a content item identifier and one or more entities included in a list of entities stored in the memory of the user device, the list of entities generated by the user device responsive to the user device receiving a signal transmitted by an entity device physically located in an entity, the content item identifier transmitted by a third-party content provider device or a content management system to a plurality of user devices that are within a geographic area around a location associated with the entity identified by the content item identifier;

determining a number of content item impressions present in the log; and providing the number of content item impressions to an administrator associated with the entity.

* * * * *